United States Patent [19]

Taylor

[11] 4,115,599

[45] Sep. 19, 1978

[54] PROCESS FOR PRODUCING GLASS ARTICLE HAVING FRAGMENT RETAINING AND ALKALI RESISTANT COATING

[75] Inventor: Lynn J. Taylor, Toledo, Ohio

[73] Assignee: Owens-Illinois, Inc., Toledo, Ohio

[21] Appl. No.: 693,616

[22] Filed: Jun. 7, 1976

Related U.S. Application Data

[63] Continuation-in-part of Ser. No. 521,217, Nov. 6, 1974, abandoned.

[51] Int. Cl.² .................... B32B 17/10; B05D 3/02
[52] U.S. Cl. .................. 427/55; 215/DIG. 6; 215/12 R; 260/830 TW; 427/386; 427/387; 428/35; 428/415
[58] Field of Search .............. 427/386, 55, 387; 428/415, 35, 417; 260/830 TW; 215/DIG. 6, 12 R

[56] References Cited

U.S. PATENT DOCUMENTS

| | | | |
|---|---|---|---|
| 3,297,186 | 1/1967 | Wells | 428/415 |
| 3,299,169 | 1/1967 | Smith | 260/830 TW |
| 3,315,035 | 4/1967 | Applegath | 428/415 |
| 3,391,053 | 7/1968 | Kolb | 428/417 |

FOREIGN PATENT DOCUMENTS

7,104,355  10/1971  Netherlands .................. 428/415

OTHER PUBLICATIONS

Helmreich, "Two Flexible Epoxy Resins", *SPE Journal*, vol. 17, No. 6, Jun., 1961, pp. 583–586.

*Primary Examiner*—Harry J. Gwinnell
*Attorney, Agent, or Firm*—Richard D. Heberling

[57] ABSTRACT

In accordance with this invention, a chemically convertible liquid coating composition is applied to the surface of a glass substrate and subsequently converted to a solid, protective polymer film by the application of heat or other forms of energy. The chemically convertible coating composition contains at least three ingredients:

(1) an epoxy resin derived from Bisphenol A and epichlorohydrin;
(2) a flexibilizing, epoxy resin; and
(3) a flexibilizing aliphatic amine curing agent.

4 Claims, No Drawings

PROCESS FOR PRODUCING GLASS ARTICLE HAVING FRAGMENT RETAINING AND ALKALI RESISTANT COATING

RELATED APPLICATIONS

This is a continuation-in-part of copending U.S. patent application Ser. No. 521,217 filed Nov. 6, 1974 (now abandoned).

INTRODUCTION

It is well-known that glass in its pristine condition is a very strong material, but that scratches and abrasion on the glass surface will considerably decrease its strength. Consequently, glass articles, for example, containers such as jars, bottles, tumblers, and the like, have maximum strength immediately after formation; however, this strength diminishes when the glass article surface contacts other surfaces as may occur during the inspection, handling, packaging, shipping, and consumer use of the article.

To overcome this problem, there has been a great deal of research in the glass industry towards development of thin, tenaciously adhering, lubricious, damage-preventive coatings which preserve the glass strength and allow the glass article to be handled and used by the consumer.

In the glass container industry, such damage-preventive coatings have been primarily of two types. In one type, the container is coated with a thin organic coating at the "cold end" of the annealing lehr where the temperature is in the neighborhood of 200°–400° F. These coatings have been water soluble polyoxyethylene stearate as in U.S. Pat. No. 2,813,045 (Abbott); polyethylene as in U.S. Pat. No. 2,995,533 (Parmer and Schaefer), and U.S. Pat. No. 2,965,596 (Scharf); or other organic materials as in U.S. Pat. Nos. 3,445,275 (Bogart); 3,487,035 (Bogart); 3,357,853 (Pickard); and 3,296,174 (Pickard).

In the second type of coating, the glass container is first coated with metal oxides such as the oxides of tin, titanium, vanadium, or zirconium at the hot end of the annealing lehr where the temperature is in the range of 1000° to 1100° F. and then overcoated with a protective organic coating at the cold end of the lehr. Such dual coatings are illustrated in U.S. Pat. Nos. 3,323,889 (Carl and Steigelman); 3,425,859 (Steigelman); 3,598,632 (Long); 3,554,787 (Plymale); 3,498,825 (Wiens); 3,418,154 (Rawski); 3,420,693 (Scholes and Pickard); 3,445,269 (Bruss, et al.); 3,407,085 (Kitaj, et al.); 3,414,429 (Bruss, et al.); and 3,352,707 (Pickard). The above types of coatings are "production line" coatings because their application is accomplished as part of the forming and annealing sequence. The disclosures of these patents are incorporated herein by reference.

The success of some of these and other types of coatings, particularly those "cold end" coatings of polyethylene or polyoxyethylene stearate (with or without the "hot end" coating of $TiO_2$ or $SnO_2$) in preserving the strength of the glass containers during inspection, handling, filling, and use has permitted glass researchers to focus on the problems caused by mishandling and accidental misuse of glass containers by the consumer.

Glass containers are sometimes fractured by dropping or other accidental misuse. This problem is particularly acute when the glass container has pressurized contents such as in the case of beer or carbonated soft drinks.

In accordance with this invention, there is provided a coating for glass containers which is capable of retaining broken glass fragments upon fracture of the glass container so as to reduce the incidence of accidental injury.

Attention has been directed to this problem in the recent past. For instance, German patent disclosure No. 2,026,909, published Dec. 10, 1970, discloses coating a glass container with a loosely or firmly adhering plastic material designed to form a "bag" which retains glass fragments when the container is broken. The film is formed by fusing powdered polyethylene to the glass bottle. German patent document No. 2,149,219, published May 25, 1972, discloses coating glass containers with a film coating of a hydrolyzed ethylene-vinyl acetate copolymer. U.S. Pat. No. 3,178,049 discloses a light, composite glass container having a wall thickness of about 0.15 to 0.70 millimeters surrounded on the outside by an envelope of a thermoplastic material having a wall thickness at least equal to the glass. U.S. Pat. No 3,415,673 discloses glass containers which are made resistant to breakage by coating the exterior surface with a thin, highly adhesive layer of plastic consisting essentially of a copolymer of ethylene and acrylic copolymers. A primer is used to tenaciously adhere the copolymer to the surface of the glass article.

The present invention improves over these types of coatings and provides an economical and expedient method of coating glass containers to provide the capability of retaining glass fragments upon fracture. Furthermore, the coatings according to the present invention possess alkali-resistance.

DESCRIPTION OF THE INVENTION

Any suitable glass substrate is contemplated. However, in the typical practice of this invention, there is utilized a glass container. The foregoing description of embodiments and specific practices of this invention will generally be discussed in terms of a glass container substrate.

In accordance with this invention, there is prepared a glass substrate, i.e., glass, containing a flexible epoxy coating having fragment-retentive properties and alkali-resistance.

More particularly, in accordance with the practice of this invention, a chemically convertible liquid coating composition is applied to the surface of a glass substrate and subsequently converted to a solid, protective polymer film by the application of heat or other forms of energy. The chemically convertible coating composition contains at least three ingredients:

(1) an epoxy resin derived from Bisphenol A and epichlorohydrin;
(2) a flexilibizing epoxy resin; and
(3) a flexibilizing aliphatic amine curing agent.

The epoxy resins derived from Bisphenol-A and epichlorohydrin have the generalized structure:

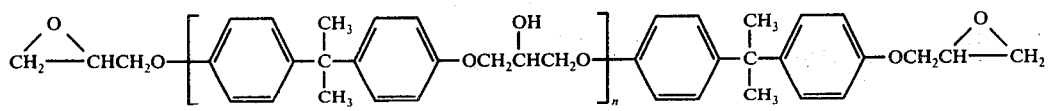

Depending on their molecular weight and purity, such epoxy resins may be liquids or solids. Typical examples of such epoxy resins include the following commercial products: D.E.R. 330, D.E.R. 331, D.E.R. 337, D.E.R. 660, D.E.R. 664, and D.E.R. 667, produced by the Dow Chemical Company of Midland, Michigan; Epon 826, Epon 828, Epon 830, Epon 1001, Epon 1004, and Epon 1007, produced by Shell Chemical Company; Araldite 6005, Araldite 6010, Araldite 6020, Araldite 6060, Araldite 6084, and Araldite 6097, produced by Ciba-Geigy Corp; Epi-Rez 510, Epi-Rez 520-C, and Epi-Rez 522-C, produced by Celanese Coatings Company; and Gen Epoxy 175, Gen Epoxy 190, Gen Epoxy 525, Gen Epoxy 925, and Gen Epoxy 1800, produced by General Mills Chemicals, Inc.

The term "flexibilizing epoxy resin", as used herein may be defined as an aliphatic diepoxide or polyepoxide possessing a flexible molecular structure which confers flexibility and impact resistance on cured compositions derived therefrom. Typically, the molecular flexibility can be ascribed to the presence of alphatic hydrocarbon and/or polyether chains joining terminal epoxide groups; cycloaliphatic structures may also be present. Typical examples of flexibilizing epoxy resins include D.E.R. 732, D.E.R. 736, and D.E.R. 741, produced by Dow-Chemical Company; Epon 871 and Epon 872, produced by Shell Chemical Company; Araldite 508 produced by Ciba-Geigy Corp.; Epi-Rez 502, Epi-Rez 5022, and Epi-Rez 505, produced by Celanese Coatings Company; and ERL-4289, produced by Union Carbide Corporation.

The term "flexibilizing amine curing agent", as used herein, may be defined as an aliphatic diamine or polyamine possessing at least two amino groups and having a flexible molecular structure which confers flexibility and impact resistance on cured compositions derived therefrom. The curing agent is free of polyether chemical structures. Typically, the molecular flexibility can be ascribed to the presence of aliphatic hydrocarbon claims joining the amino groups; cycloaliphatic or heterocyclic aliphatic structures may also be present. Typical examples of flexibilizing amine curing agents include 2,2,4-trimethylhexamethylene diamine and its 2,4,4 isomer; isophorone diamine; dimer acid diprimary amine, produced by Humko Sheffield Chemical, and heterocyclic aliphatic diamines such as AJICURE B-001, AJICURE B-002, AJICURE B-003, AJICURE C-002, and AJICURE N-001, produced by Ajinomoto Co.

In addition to the two epoxy resins and the amine curing agent, the liquid coating compositions of this invention may contain several additional ingredients, including cure accelerators, reactive diluents, solvents, colorants, stabilizers, flow-control agents, surfactants, plasticizers, etc. The use of silane coupling agents as adhesion-promoting additives has been found to be particularly advantageous in situations requiring strong adhesion in the presence of warm aqueous alkali, as is the case with a coated returnable glass container.

In the practice of this invention, the Bisphenol-A derived epoxy resin and the flexibilizing epoxy resin are ordinarily employed in ratios of 4:1 to 1:4 by weight. The quantity of flexibilizing amine curing agent is employed in an amount ranging from 0.80 to 1.25 times the stoichiometric amount, which is calculated from the equivalent weights of the material employed. The stoichiometric amount of curing agent is defined as the minimum quantity required to completely react with all of the epoxy groups of both epoxy resins. Thus the curing agent is utilized in an amount of 80 to 125% of the minimum quantity required for complete chemical reaction with all available epoxy groups.

The liquid coating compositions of this invention may be applied to the surfaces of glass objects such as bottles by a variety of processes known in the prior art, such as spraying, dipping, flow-coating, roller-coating, and silk-screening. The curing of the resulting coating may be accomplished by the application of energy in any suitable form, such as heat or infrared radiation.

The practice of this invention may be used in conjunction with or independently of other glass surface treating or coating techniques. Thus the flexibilized epoxy coatings of this invention may be applied to the glass surface before or after the application of other coatings.

The epoxy coatings may be applied continuously or discontinuously over the glass surface.

The thickness of the epoxy coatings (cured on the glass substrate) typically ranges from about 4 to 12 mils (1 mil equals 0.001 inch).

I claim:

1. A process for applying a flexibilized epoxy coating to a glass substrate, said coating having glass fragment-retentive properties and alkali-resistance, which process comprises applying a chemically convertible liquid coating composition to the surface of a glass substrate and then converting the liquid composition to a solid, protective polymeric film by the application of energy, the chemically convertible coating composition consisting of the following ingredients:
   (1) an epoxy resin derived from Bisphenol A and epichlorohydrin;
   (2) a flexibilizing aliphatic diepoxide or polyepoxide resin having a flexible molecular structure selected from the group consisting of aliphatic hydrocarbon and polyether chains joining terminal epoxide groups;
   (3) a polyether-free, flexibilizing aliphatic diamine or polyamine curing agent having at least two amino groups and having a flexible molecular structure and being present in an amount ranging from 0.80 to 1.25 times the stoichiometric amount calculated from the equivalent weights of said Bisphenol-A derived epoxy resin and flexibilizing epoxy resin, said stoichiometric amount of curing agent being the minimum quantity required to completely react with all of the epoxy groups of both epoxy resins; and
   (4) a silane coupling agent.

2. The invention of claim 1 wherein the Bisphenol-A derived epoxy resin and the flexibilizing epoxy resin are employed in relative weight ratios of about 4:1 to 1:4.

3. The invention of claim 2 wherein the flexibilizing amine curing agent is selected from the group consisting of 2,2,4-trimethylhexamethylene diamine, 2,4,4-trimethylhexamethylene diamine, isophorone diamine, dimer acid diprimary amine, and heterocyclic aliphatic diamine.

4. The invention of claim 1 wherein the solid polymeric film ranges from about 4 to 12 mils.

* * * * *